(12) United States Patent
Min et al.

(10) Patent No.: US 8,268,036 B2
(45) Date of Patent: Sep. 18, 2012

(54) PROCESS FOR PRODUCTION OF ULTRA LOW PHOSPHOROUS AND CARBON FERROMANGANESE BY USING OF FERROMANGANESE SLAG

(75) Inventors: Dong-Shik Min, Seoul (KR); Chan-Soo Park, Seoul (KR); Young-Eun Lee, Seoul (KR); Hai-Chang Cho, Seoul (KR); Kwang-Jung Lee, Seoul (KR); Sung-Hwan Hong, Seoul (KR)

(73) Assignee: Dongbu Metal Co., Ltd., Seoul (KR)

( * ) Notice: Subject to any disclaimer, the term of this patent is extended or adjusted under 35 U.S.C. 154(b) by 91 days.

(21) Appl. No.: 12/937,533

(22) PCT Filed: Nov. 19, 2008

(86) PCT No.: PCT/KR2008/006808
§ 371 (c)(1),
(2), (4) Date: Oct. 12, 2010

(87) PCT Pub. No.: WO2009/136684
PCT Pub. Date: Nov. 12, 2009

(65) Prior Publication Data
US 2011/0265608 A1    Nov. 3, 2011

(30) Foreign Application Priority Data
May 6, 2008   (KR) .................. 10-2008-0041915

(51) Int. Cl.
*C22B 7/04*    (2006.01)
*C22C 38/04*   (2006.01)

(52) U.S. Cl. ........................... 75/625; 420/434
(58) Field of Classification Search .............. 75/625; 420/434
See application file for complete search history.

(56) References Cited

U.S. PATENT DOCUMENTS 3,395,011 A * 7/1968 Dery et al. ............... 75/624
4,363,657 A * 12/1982 Boscaro et al. ........... 420/434

FOREIGN PATENT DOCUMENTS

| JP | 58104151  | 6/1983  |
| JP | 60067608  | 4/1985  |
| JP | 6330227   | 11/1994 |
| KR | 970009513 | 6/1997  |

OTHER PUBLICATIONS

International Search Report for International Application No. PCT/KR2008/006808, 2 pages, Jul. 3, 2009.
English language abstract of Japan Patent Publication No. JP 60-067608, esp@cent database, Apr. 18, 1985.
English language abstract of Japan Patent Publication No. JP 58-104151, esp@cent database, Jun. 21, 1983.
English language abstract of Japan Patent Publication No. JP 63-30227, esp@cent database, Nov. 29, 1994.
English language abstract of Korean Patent Publication No. KR 97-0009513, esp@cent database, Jun. 14, 1997.

* cited by examiner

*Primary Examiner* — George Wyszomierski
*Assistant Examiner* — Tima M McGuthry Banks
(74) *Attorney, Agent, or Firm* — Cooper & Dunham LLP

(57) ABSTRACT

Disclosed is a method of producing ultra low phosphorus and carbon ferromanganese having 0.1 wt % or less carbon and 0.03 wt % or less phosphorus. The method includes preparing low carbon silicomanganese having low phosphorus content, preparing molten manganese slag, subjecting the molten manganese slag and the low carbon silicomanganese having low phosphorus content to primary mixing and stirring at a ratio of 70~72:28~30 in a ladle, thus producing a metal melt and slag, and subjecting the metal melt separated from the above slag and the molten manganese slag identical to that used in the primary mixing and stirring to secondary mixing and stirring, thus producing slag and a metal melt including 91~93 wt % manganese, 0.60~0.85 wt % silicon, 0.05~0.10 wt % carbon and 0.015~0.02 wt % phosphorus.

7 Claims, No Drawings

PROCESS FOR PRODUCTION OF ULTRA LOW PHOSPHOROUS AND CARBON FERROMANGANESE BY USING OF FERROMANGANESE SLAG

CROSS-REFERENCE TO RELATED APPLICATIONS

This application is a national stage entry under 35 U.S.C. §371 of PCT International Application No. PCT/KR08/06808, filed Nov. 19, 2008, which claims the priority of Korean Patent Application No. 10-2008-0041915, filed in the Korean Intellectual Property Office on May 6, 2008.

TECHNICAL FIELD

The present invention relates to a method of producing ultra low phosphorus and carbon ferromanganese (ULPC FeMn) using FeMn slag, and particularly, to a method of producing ULPC FeMn having 0.1 wt % or less C and 0.03 wt % or less P, by subjecting molten Mn slag composed mainly of high C FeMn, and low carbon silicomanganese (LCSiMn) in which P and C contents are ultra low to mixing and stirring, so that a desilication reaction occurs.

BACKGROUND ART

ULPC FeMn has been conventionally produced by charging a Mn-containing melt made of low P ore used as a material for minimizing P content and a reducing agent, for example, Si or FeSi, and mixing and stirring charged materials through horizontal eccentric movement, thereby reducing Mn oxide of the Mn-containing melt with the reducing agent, yielding high-quality and high-purity FeMn. However, the low P ore or the non-carbonaceous reducing agent (Si or FeSi) is expensive, undesirably increasing the production cost of ULPC FeMn. In order to achieve an efficient reaction in the process, a high-purity reducing agent in which Si component of the non-carbonaceous reducing agent is 65~98 wt % must be used. If the purity of Si component is not high, upon the desilication reaction through mixing and stirring with the Mn-containing melt, Mn recovery is low, thus making it difficult to ensure the economic benefits of the process. Further, slag produced after the process is not recycled but is discarded, undesirably incurring resource waste problems.

DISCLOSURE

Technical Problem

Accordingly, the present invention has been made keeping in mind the above problems encountered in the related art, and an object of the present invention is to provide a method of producing ULPC FeMn, in which ULPC molten Mn slag obtained by melting conventionally wasted high C FeMn slag instead of conventionally used low P ore is used as a main material, and ULPC dephosphorized LCSiMn is used as a material and a reducing agent, so that a desilication reaction occurs, thereby mass producing ULPC FeMn at low cost.

Technical Solution

In order to accomplish the above object, the present invention provides a method of producing ULPC FeMn which includes the dephosphorization of LCSiMn serving as a material and a reducing agent, and the mixing of molten Mn slag and dephosphrized SiMn, so that desilication occurs, thereby producing high-quality and high-purity FeMn, and specifically, includes preparing LCSiMn having low P content, preparing molten Mn slag composed mainly of high C FeMn slag, subjecting the molten Mn slag and the LCSiMn having low P content to primary mixing and stirring at a ratio of 70~72:28~30 in a ladle, thus producing a metal melt and slag, and subjecting the metal melt separated from the slag obtained in the primary mixing and stirring and the molten Mn slag identical to that used in the primary mixing and stirring to secondary mixing and stirring, thus producing slag and a metal melt composed of 91~93 wt % Mn, 0.60~0.85 wt % Si, 0.05~0.10 wt % C and 0.015~0.02 wt % P. As such, the secondary mixing and stirring may be performed a further one or two times depending on the temperature of the melt or stirring conditions.

In the method, preparing the LCSiMn having low P content may be performed by charging LCSiMn composed of 55~60 wt % Mn, 25~30 wt % Si, 0.04 wt % or less C and 0.08~0.1 wt % P into a ladle furnace, supplying a stirring gas such as argon or nitrogen while heating the LCSiMn to 1400~1650° C., thus making the LCSiMn homogeneous, adding the homogeneous LCSiMn with quicklime and fluorite and stirring them for 10~30 min, so that dephosphorization occurs to thus obtain 0.03 wt % or less P.

In the method, preparing the molten Mn slag may be performed by mixing 8~10% of Mn dust having 66 wt % Mn, 8~13% of quicklime, 31~54% of high C FeMn slag having 28 wt % Mn, and 30~53% of recycled high C FeMn slag having 12~18% Mn in an electric furnace. In the method, the stirring of the primary mixing and stirring may be performed for 10~30 min using an impeller made of alumina, and among slag produced in the primary mixing and stirring and the secondary mixing and stirring, slag having Mn less than 10% is wasted, and slag having 10% or more Mn is charged again into the electric furnace for producing the molten Mn slag or is recycled, thus recovering Mn.

Hereinafter, a detailed description will be given of the present invention.

According to the present invention, the method of producing ULPC FeMn mainly includes the dephosphorization for preparation of LCSiMn having low P content and the desilication of molten Mn slag.

As the non-carbonaceous reducing agent used in the present invention, LCSiMn typically contains 0.06~0.08 wt % C and 0.1 wt % P. Thus, in order to produce ULPC FeMn, the P content of LCSiMn should be further lowered.

The LCSiMn dephosphorization is performed by reducing CaO using Si of LCSiMn, thus generating Ca, which is then reacted with P contained therein, thus forming $Ca_3P_2$ insoluble to an LCSiMn melt, thereby eliminating P. The main reactions of this process are represented by Reactions 1 and 2 below.

$Si+2CaO=SiO_2+2Ca$    Reaction 1

$3Ca+2P=Ca_3P_2$    Reaction 2

For the dephosphorization reaction as above, the Si content of LCSiMn should be 27 wt % or more. Further, CaO, which is a flux used for the dephosphorization reaction, is a high-melting point oxide, and thus is difficult to form into a molten slag when used alone, making it impossible to attain high dephosphorization efficiency. Accordingly, as a flux to be used along with CaO, a predetermined proportion of $CaF_2$ may be added Specifically, when the flux is used under conditions of $CaO/CaF_2=1.5~4$, the activity of CaO may be maintained high and satisfactory slag fluidity may be ensured, and thus the dephosphorization process may be efficiently performed. Further, to further increase the reaction efficiency of the dephosphorization process, the mixing of LCSiMn and flux should be enhanced. To this end, stirring using an inert gas or mechanical stirring may be utilized, such that stirring force is strengthened.

In the present invention, LCSiMn is heated in a ladle furnace, transferred into a ladle, added with a flux such as quicklime and fluorite and then forcibly stirred using an impeller, thus controlling the P content of SiMn. Through these procedures, the slag composition is controlled, and dephosphorization is performed so as to attain 0.03 wt % or less P.

The quicklime contains Ca effective for control of P and thus plays a role in controlling the P content of SiMn, and fluorite ($CaF_2$) ensures the fluidity of the slag (ensures a reactive interface between SiMn metal melt and slag), thus forming conditions for facilitating the dephosphorization. Further, in order to effectively achieve the dephosphorization, the flux may be added in twice depending on the degree of dephosphorization. In particular, in the case where it is difficult to ensure fluidity because of a low dephosphorization temperature, the ratio of quicklime to fluorite may be adjusted, thus ensuring the fluidity of the slag, thereby increasing the dephosphorization efficiency.

Moreover, the dephosphorization process of LCSiMn may be advantageously performed as the temperature and basicity which are main parameters thereof are raised, and also, the dephosphorization efficiency may be increased in proportion to an increase in the Si content of LCSiMn.

The production of molten Mn slag useful for the desilication process includes mixing, in an electric furnace, Mn dust having 62~68 wt % Mn, quicklime having 93 wt % CaO, high C FeMn slag having 26 wt % Mn, and recycled high C FeMn slag having 12~18 wt % Mn, thus obtaining molten Mn slag having 28 wt % Mn.

The reason why the Mn dust having 62~68 wt % Mn is used is that the Mn dust acts as a material for increasing the Mn content in the slag, and the reason for use of the quicklime is that basicity ($CaO/SiO_2$) is adjusted and the activity of Mn in the slag is increased to thus make the reduction of Mn easier. However, in the case of CaO, its melting point is high and thus it cannot be unlimitedly melted in the slag. So, CaO is charged to the threshold level (about $CaO/SiO_2$). The reason why the high C FeMn slag is used as a main material is because the P content which is intended to be controlled in the present invention is maintained low in the above slag, and therefore, a final product resulting from the desilication has low P content. Typically, because P has a high tendency to migrate to metal and a low tendency to migrate to slag, SiMn in which the P content is minimized and the prepared slag (of low P content) are mixed and stirred, so that the desilication reaction occurs. Thereby, ULPC FeMn may be easily produced.

Prepared to produce ULPC FeMn, the molten Mn slag and the dephosphorized LCSiMn having low P content are mixed together, so that the desilication reaction occurs. As such, the desilication reaction is a process of reducing the Mn of the slag using the Si component of SiMn as a reducing agent. Generally, when the reaction begins to occur, reaction heat is generated so that the reduction reaction continuously takes place, thereby expecting temperature correction for the dropping of the temperature.

In the present invention, the molten Mn slag and the LCSiMn having low P content are mixed at a ratio of 70~72: 28~30 in a ladle. If the ratio falls outside of the above range, efficiencies of the molten Mn slag and the LCSiMn having low P content are deteriorated, undesirably degrading the economic benefits of a product. Thus, it is optimal that the process be performed within the above range.

In the present invention, the LCSiMn having low P content and the molten Mn slag, which are separately prepared, are placed in a reactor, and the process reaction proceeds through the desilication reaction as represented by Reaction 3 below.

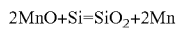

$$2MnO+Si=SiO_2+2Mn \qquad \text{Reaction 3}$$

In this case, the desilication reaction is exothermic, and the produced heat value is adapted to minimize the dropping of the temperature so that the reduction reaction continuously takes place.

If the total amount of the molten Mn slag and the reducing agent necessary for the reaction is mixed at the same time and the process proceeds, the reaction efficiency is low and it is thus difficult to ensure economic benefits. Theoretically, if the above reaction proceeds through a count current flow process, high reaction efficiency may be obtained. Actually, however, this method is difficult to apply using the theoretical system. Alternatively, if the reaction procedure is performed in multiple steps, the process is actually possible, and the reaction efficiency thereof may approximate that of the count current flow process. To obtain satisfactory reaction efficiency, the molten Mn slag as initially prepared should be reacted with LCSiMn prepared through the dephosphorization process. As such, the dephosphorization reaction proceeds as represented by Reaction 3. When the amounts of molten Mn slag and dephosphorized LCSiMn are adjusted and they are reacted, the Mn content of the resultant slag is minimized as much as possible and the Si content of the resultant FeMn is lower than the Si content of the initial LCSiMn. Subsequently, Si contained in the FeMn metal melt obtained in the previous step is used as the non-carbonaceous reducing agent and is mixed with the prepared molten Mn slag, after which the desilication reaction as represented by Reaction 3 proceeds through the process as in the previous step. In this case, the Si content of the resultant FeMn is much lower than the Si content of the FeMn obtained in the previous step. When such stepwise reactions are sufficiently performed, the Si content of the finally obtained FeMn is decreased to 1 wt % or less. The amount of reduced Mn is adapted to dilute C and P contained in the initial material, resulting in the desired ULPC FeMn. Typically, when the above desilication reaction is performed in 3~4 steps, the Si content of the FeMn is decreased to 1 wt % or less, and the C and P contents are respectively 0.1 wt % and 0.03 wt %.

As a vessel used for the desilication reaction of the present invention, a ladle made of a fireproof material such as magnesia carbon is used.

Further, in order to maximize the desilication reaction of molten Mn slag and LCSiMn having low P content, there is a need to enhance the stirring force. To this end, physical stirring is performed. Typically, stirring is conducted by blowing an inert gas into the ladle or agitating the ladle to thus mix and stir the charged materials. To achieve much stronger stirring effects, physical stirring using an impeller is more effective. Hence, in the present invention, to obtain more efficient stirring effects, an impeller made of alumina is used, and further, the position of the impeller immersed is adjusted, thus obtaining more effective stirring force. When the position of the impeller is adjusted to fall outside of the center of the ladle so that the impeller is eccentrically immersed to thus perform eccentric movement, a more effective desilication reaction may be expected, compared to when stirring is performed using the impeller which is located in the center of the ladle. Also, for much stronger mixing, nitrogen or argon and air may be used as stirring gases, in addition to the physical stirring, thus enhancing the stirring force.

The desilication reaction used in the present invention includes two-step mixing and stirring or three or four-step mixing and stirring. In the case of three-step mixing and stirring, a Mn recovery is about 86% which is lower than a Mn recovery of 92% of the four-step mixing and stirring, but is advantageous because the process may become simple and the process time may be shortened, thus solving problems due to the dropping of the temperature. However, when the number of steps for mixing and stirring is decreased, there occur the problems of having to increase the size of the ladle because the amount of slag used at one time is large and that of deteriorating the reaction efficiency. Thus, the number of steps is preferably set depending on the reaction conditions.

The Mn content of the slag produced after the desilication reaction is lower than that before the reaction. If the Mn content of the slag is less than 10%, there is no need to recycle the slag. In contrast, if the Mn content is 10% or more, the slag may be charged again into the slag furnace and thus recycled.

The molten Mn slag to be used in the desilication process is composed mainly of molten Mn slag in which P and C contents are ultra low. In the case where the Mn content should be increased, Mn dust having high Mn content, generated from an FeMn refinery, may be used, and also, recycled slag generated in the process may be used.

To increase the reaction efficiency between the slag and the metal, CaO is added so that the slag basicity ($CaO/SiO_2$) is adjusted to about 1.0.

Advantageous Effects

According to the present invention, molten Mn slag and ULPC SiMa are mixed and stirred, so that a desilication reaction occurs, thereby easily and efficiently producing high-quality ULPC FeMn. Also, slag which has been partially recycled or wasted in a conventional process of preparing SiMn can be recycled, thus generating economic benefits.

BEST MODE

A better understanding of the present invention may be obtained through the following examples which are set forth to illustrate, but are not to be construed as limiting the present invention.

Example 1

In order to deduce dephosphorization conditions for producing LCSiMn having low P content from SiMn in an electric furnace, the following experiment was performed.

LCSiMn having 59 wt % Mn, 29 wt % Si and 0.06 wt % C was charged a Carbon crucible, melted at 1350° C., and mixed with a flux at a ratio of $CaO/CaF_2$=1.75. As such, the flux was added in twice into an upper part of the melt.

The experimental results are shown in Table 1 below.

TABLE 1

Results of Dephosphorization of LCSiMn

|  | Mn | Si | P | Fe | C |
|---|---|---|---|---|---|
| Initial LCSiMn | 59.40 | 29.83 | 0.092 | 9.51 | 0.05 |
| 1st Addition of Flux | 59.20 | 29.52 | 0.049 | 9.85 | 0.11 |
| 2nd Addition of Flux | 59.59 | 28.72 | 0.025 | 10.07 | 0.21 |

The P content was decreased from 0.092 wt % to 0.025 wt %.

Example 2

6 tons of LCSiMn having low P content with a melt temperature of 1400° C. was charged into a ladle, after which 12.2 tons of molten Mn slag at 1400° C. prepared in a furnace was charged into the ladle. The slag and metal in the ladle were sufficiently stirred so that a desilication reaction occurred. After the stirring process, the produced slag was separated and the metal remained in the ladle and was used as a non-carbonaceous reducing agent in a subsequent step. During the process, the slag formed in steps 1 and 2 had Mn less than 10 wt % and was thus wasted. The slag formed in steps 3 and 4 had 12 wt % Mn and 16 wt % Mn respectively, and thus was charged into a slag furnace to recycle it.

After step 4, 10 tons of ULPC FeMn having a metal composition composed of 92 wt % Mn, 0.85 wt % Si, 0.034 wt % C, and 0.029 wt % or less P was produced.

For the efficient desilication reaction occurring from steps 1 to 4, the basicity ($CaO/SiO_2$) of the molten Mn slag charged into the ladle was maintained at the level of 1.0~1.1.

The amounts of materials used in respective steps and the changes in composition before and after the reaction are shown below.

TABLE 2

Change in Composition upon 4-step Slag Addition—Change in Slag Composition

|  | Wt, kg | % Mn | % Fe | % $SiO_2$ | % CaO | % C | % P |
|---|---|---|---|---|---|---|---|
| Before 1st Reaction | 12220 | 21.65 | 0.22 | 23.95 | 26.31 | 0.033 | 0.004 |
| After 1st Reaction | 10609 | 4.81 | 0.05 | 38.71 | 30.30 | 0.038 | 0.003 |
| Before 2nd Reaction | 8750 | 21.65 | 0.22 | 23.95 | 26.31 | 0.033 | 0.004 |
| After 2nd Reaction | 7743.65 | 7.23 | 0.07 | 36.58 | 29.73 | 0.038 | 0.004 |
| Before 3rd Reaction | 12790 | 24.82 | 0.41 | 22.42 | 24.66 | 0.033 | 0.006 |
| After 3rd Reaction | 11458 | 12.4 | 0.2 | 33.53 | 27.52 | 0.038 | 0.003 |
| Before 4th Reaction | 15680 | 22.48 | 0.57 | 24.42 | 26.89 | 0.035 | 0.007 |
| After 4th Reaction | 14806 | 16.14 | 0.41 | 30.16 | 28.48 | 0.038 | 0.002 |

TABLE 3

Change in Composition upon 4-step Slag Addition—Change in Metal Composition

|  | Wt, kg | % Mn | % Fe | % Si | % C | % P |
|---|---|---|---|---|---|---|
| Before 1st Reaction | 6000 | 58 | 10 | 29 | 0.060 | 0.025 |
| After 1st Reaction | 7428.96 | 75.6 | 8.37 | 16 | 0.048 | 0.022 |
| Before 2nd Reaction | 7428.96 | 75.6 | 8.37 | 16 | 0.048 | 0.022 |
| After 2nd Reaction | 8432.79 | 82.42 | 7.54 | 10.01 | 0.043 | 0.021 |
| Before 3rd Reaction | 8432.79 | 82.42 | 7.54 | 10.01 | 0.043 | 0.021 |
| After 3rd Reaction | 9760 | 89.18 | 6.81 | 3.98 | 0.037 | 0.023 |
| Before 4th Reaction | 9760 | 89.18 | 6.81 | 3.98 | 0.037 | 0.023 |
| After 4th Reaction | 10628 | 92.58 | 6.53 | 0.85 | 0.034 | 0.029 |

Example 3

Using the same procedures as in Example 1, the amount of molten slag to be charged was uniformly maintained in respective steps, and the process was performed only to step 3.

The slag formed in steps 1 and 2 had 10 wt % or less Mn and thus was wasted. The slag formed in step 3 had 18 wt % Mn, and thus was charged into a slag furnace to recycle it.

After step 3, about 10.7 tons of a metal melt composed of 93 wt % or more Mn, 0.6 wt % Si, 0.034 wt % C, and 0.028 wt % or less P was produced.

TABLE 4

Change in Composition upon 3-step Slag Addition—Change in Slag Composition

|  | Wt, kg | % Mn | % Fe | % SiO$_2$ | % CaO | % C | % P |
|---|---|---|---|---|---|---|---|
| Before 1$^{st}$ Reaction | 13000 | 24.29 | 0.18 | 22.42 | 24.52 | 0.036 | 0.004 |
| After 1$^{st}$ Reaction | 11074.60 | 5.39 | 0.04 | 39.05 | 28.78 | 0.043 | 0.003 |
| Before 2$^{nd}$ Reaction | 13000 | 24.29 | 0.18 | 22.42 | 24.52 | 0.036 | 0.004 |
| After 2$^{nd}$ Reaction | 11509.76 | 10.23 | 0.07 | 34.80 | 27.69 | 0.041 | 0.003 |
| Before 3$^{rd}$ Reaction | 13000 | 31.49 | 0.63 | 18.98 | 20.83 | 0.037 | 0.009 |
| After 3$^{rd}$ Reaction | 11511.70 | 18.61 | 0.37 | 30.89 | 23.52 | 0.042 | 0.001 |

TABLE 5

Change in Composition upon 3-step Slag Addition—Change in Metal Composition

|  | Wt, kg | % Mn | % Fe | % Si | % C | % P |
|---|---|---|---|---|---|---|
| Before 1$^{st}$ Reaction | 6000 | 58 | 10 | 29 | 0.060 | 0.025 |
| After 1$^{st}$ Reaction | 7743.09 | 78.02 | 7.99 | 13.95 | 0.047 | 0.022 |
| Before 2$^{nd}$ Reaction | 7743.09 | 78.02 | 7.99 | 13.95 | 0.047 | 0.022 |
| After 2$^{nd}$ Reaction | 9228.61 | 86.92 | 6.87 | 6.18 | 0.039 | 0.022 |
| Before 3$^{rd}$ Reaction | 9228.61 | 86.92 | 6.87 | 6.18 | 0.039 | 0.022 |
| After 3$^{rd}$ Reaction | 10712.06 | 93.10 | 6.29 | 0.58 | 0.034 | 0.028 |

The invention claimed is:

1. A method of producing ultralow phosphorus and carbon ferromanganese, comprising:
   preparing low carbon silicomanganese having low phosphorus content;
   preparing a first molten manganese slag composed mainly of high carbon ferromanganese slag;
   subjecting the molten manganese slag and the low carbon silicomanganese having low phosphorus content to primary mixing and stirring at a ratio of 70~72:28~30 in a ladle, thus producing separated metal melt and slag;
   providing a second molten manganese slag composed mainly of high carbon ferromanganese slag; and
   subjecting the metal melt separated from the slag produced in the primary mixing and stirring and the second molten manganese slag to secondary mixing and stirring, thus producing a second slag and a metal melt comprising 91~93 wt % manganese, 0.60~0.85 wt % silicon, 0.05~0.10 wt % carbon and 0.015~0.02 wt % phosphorus.

2. The method according to claim 1, wherein the secondary mixing and stirring is performed a further one or two times depending on the temperature of the melt or stirring conditions.

3. The method according to claim 1, wherein the preparing the low carbon silicomanganese having low phosphorus content is performed by charging low carbon silicomanganese comprising 55~60 wt % manganese, 25~30 wt % silicon, 0.04 wt % or less carbon and 0.08~0.1 wt % phosphorus with iron being a balance into a ladle furnace, supplying a stirring gas including argon or nitrogen while heating the low carbon silicomanganese to 1400~1650° C., thus making the low carbon silicomanganese homogeneous, adding the homogeneous low carbon silicomanganese with quicklime and fluorite and stirring them for 10~30 min, so that dephosphorization occurs to thus obtain 0.03 wt % or less phosphorus.

4. The method according to claim 1, wherein the preparing the molten manganese slag is performed by mixing 8~10% of manganese dust having 66 wt % manganese, 8~13% of quicklime, 31~54% of high carbon ferromanganese slag having 28 wt % manganese, and 30~53% of recycled high carbon ferromanganese slag having 12~18% manganese in an electric furnace.

5. The method according to claim 4, wherein the molten manganese slag has a basicity (CaO/SiO2) of 1.0~1.1.

6. The method according to claim 1, wherein the stirring of the primary mixing and stirring is performed for 10~30 min using an impeller made of alumina.

7. The method according to claim 1, wherein, among slag produced in the primary mixing and stirring and the secondary mixing and stirring, slag having manganese less than 10% is wasted, and slag having 10% or more manganese is charged again into an electric furnace for producing the molten manganese slag or is recycled, thus recovering manganese.

* * * * *